United States Patent [19]
Uozumi et al.

[11] 3,733,927
[45] May 22, 1973

[54] HYDRAULIC CONTROL SYSTEM FOR AN AUTOMATIC TRANSMISSION

[75] Inventors: Sumio Uozumi; Kiyoshi Ohnuma, both of Toyota, Japan

[73] Assignee: Toyota Jidosha Kogyo Kabushiki Kaisha, Aichi-ken, Japan

[22] Filed: Oct. 26, 1971

[21] Appl. No.: 192,252

Related U.S. Application Data

[63] Continuation-in-part of Ser. No. 36,954, May 13, 1970, abandoned.

[52] U.S. Cl. ..................74/753, 74/731, 74/868
[51] Int. Cl......F16h 57/10, F16h 47/00, B60k 21/00
[58] Field of Search......................137/117; 74/863–865, 867–869, 753

[56] References Cited

UNITED STATES PATENTS

| | | | |
|---|---|---|---|
| 3,336,815 | 8/1967 | Leonard | 74/869 X |
| 3,393,585 | 7/1968 | Pierce, Jr. | 74/869 X |
| 3,505,910 | 4/1970 | Shimosaki | 74/864 |

Primary Examiner—Arthur T. McKeon
Attorney—John J. McGlew and Alfred E. Page

[57] ABSTRACT

A hydraulic control system, for an automatic transmission having a torque converter or a fluid coupler and a servo-operated speed change gear for use in vehicles, includes a pressure regulator valve regulating a control pressure applied to the servos of the speed change gear, an oil pump driven by an engine crank shaft for supplying the control pressure, and a shunt passage which is opened or blocked off by the pressure regulator valve to recirculate or shut off the flow of pressure oil to the pump according to the vehicle speed. When the vehicle is driven above a predetermined speed, the shunt passage is opened and the pressure oil circulates through an orifice which reduces the discharge oil pressure or the control pressure for the servo units due to an increase in oil flow to assure a smooth gear change in the drive range of the transmission and, when the vehicle is started, or driven at a low speed, the shunt passage is blocked, thereby establishing a high control pressure applied to the servo units, assuring a sure and smooth gear change in low and reverse ranges of the transmission.

10 Claims, 6 Drawing Figures

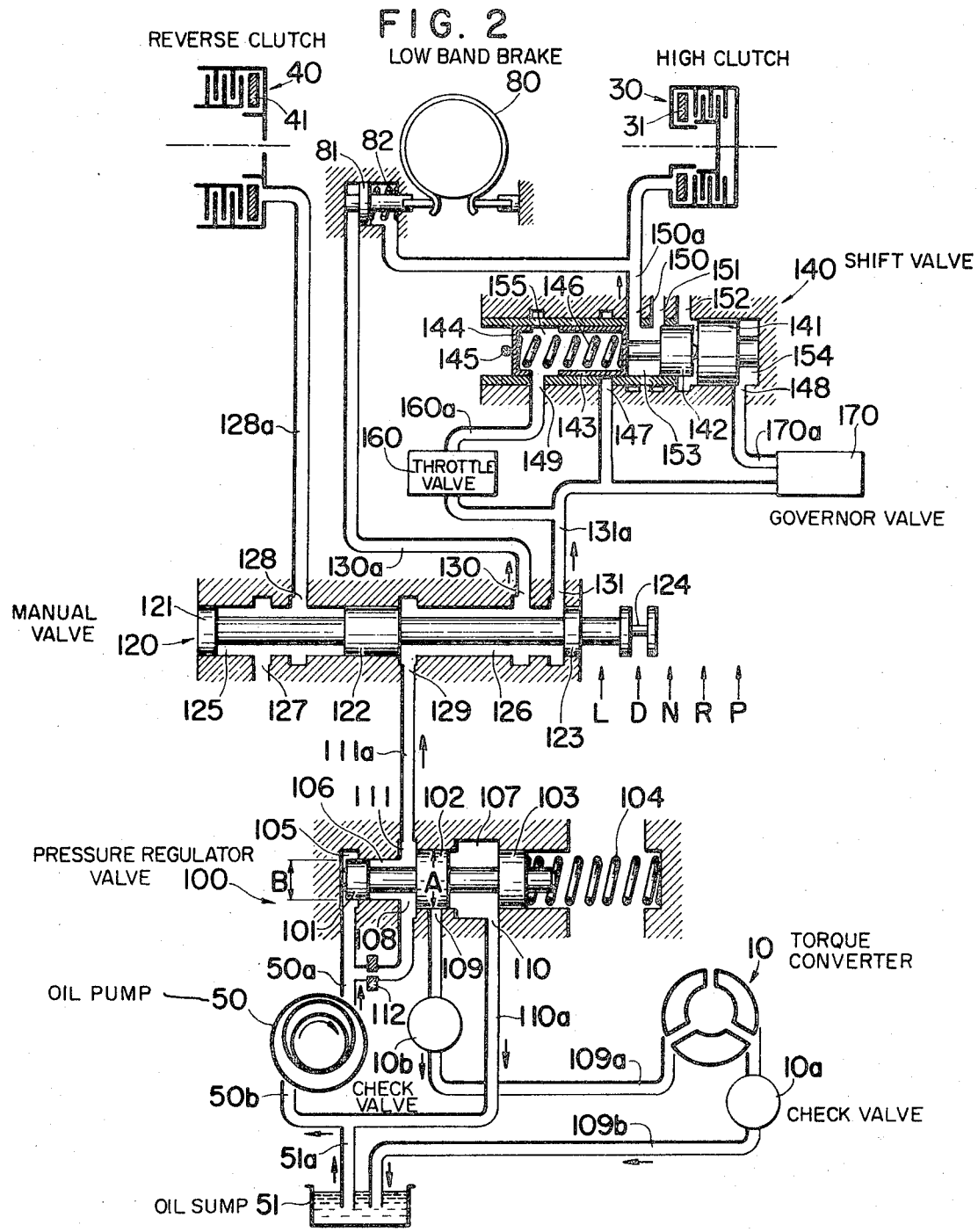

HYDRAULIC CONTROL SYSTEM FOR AN AUTOMATIC TRANSMISSION

CROSS-REFERENCE TO RELATED APPLICATION

This application is a continuation-in-part of application Ser. No. 36,954, filed May 13, 1970, now abandoned.

FIELD OF THE INVENTION

This invention relates to hydraulic control system for automatic transmissions and, more particularly, to a novel and improved control system whereby, with only a single pump, the proper operating pressure for brake and clutch servos is provided both during starting of the vehicle and during normal running of the vehicle.

SUMMARY OF THE INVENTION

The present invention relates to a control system for an automatic transmission adapted for use with the motor vehicles. In general, an automatic transmission is composed of a fluid torque converter for establishing an increased torque from a mechanical output of an internal combustion engine and a planetary gear unit, provided with hydraulically operated clutches and brake bands, for changing gear in relation to the vehicle speed and the throttle valve opening. For operating the clutches and brake bands, there are provided a front oil pump directly driven by an engine crank shaft and a rear oil pump driven by an output shaft of the transmission, and both pumps are used in such a manner that the front pump is changed over to the rear pump when a certain vehicle speed is exceeded. Namely, since the line pressure for applying the clutches and brake bands is not required to be as high in normal driving as at starting, the output loss of the engine due to the oil pump is reduced by the use of a small capacity rear pump. Therefore, in a conventional hydraulic control system a hair-pin check valve or a compensation valve is required. Particularly when the compensation valve is used for establishing a compensation pressure with relation to both the throttle pressure proportional to the throttle valve opening and the governor pressure proportional to the vehicle speed, the pressure is applied to a pressure regulator valve to control the line pressure or its own pressure at a suitable value and at the same time either of the above two oil pumps is to be selectively used.

The above control system, owing to the necessity of two oil pumps and the complicated construction of the pressure regulator valve, has the disadvantages that its adjustment is not easy and its cost is expensive.

The principal object of this invention is to provide a hydraulic control system for an automatic transmission wherein the function of two units of conventional oil pumps is performed by a single unit and, moreover, a comparatively high line pressure is supplied while the pump speed or vehicle speed is low, and wherein the line pressure can be lowered to a predetermined value when the vehicle speed is increased. Accordingly, a sufficiently high line pressure is applied to the clutches and brake bands at the time of starting the vehicle to permit the transmission to establish a large torque, thus securing sure and smooth starting. On the other hand, when the vehicle speed exceeds, for instance, 30 to 40 km/h, the line pressure decreases with the increase in the vehicle speed and, in the usual drive, an appropriately low line pressure is applied to the clutches and brake bands to afford smooth and shockless automatic gear change.

Therefore, under normal driving speeds the oil pump will be sufficient with a small driving power, which reduces the output loss of the engine and prevents the occurrence of cavitation, which eliminates noise due to vibration of the pump.

According to the invention, a hydraulic control system for an automatic transmission comprises pressurized oil passages communicating with the hydraulic servo units of clutches and brake bands attached to the transmission, an oil pump and an oil sump for supplying oil at a predetermined pressure to the above passages, a pressure regulator valve which is positioned between the above passages and a discharge passage of the oil pump and operates according to the resultant of, or the difference between, a discharge pressure of the oil pump and a pressure reduced through a circuit resistance, such as an orifice, and a shunt passage which returns the pressure oil directly from the above pressure regulator valve to the suction side of the oil pump. When the pump speed exceeds a predetermined level, the quantity of oil flowing into the shunt passage through the above circuit resistance increases, thereby lowering the hydraulic pressure directed to the pressurized oil passages.

Moreover, the invention contemplates the provision of an exhaust oil pressure regulator valve in the shunt passage for limiting the reduction of the hydraulic pressure in the passages thus to prevent the pressure from dropping below a certain level.

The various features of novelty which characterize the invention are pointed out with particularity in the claims annexed to and forming a part of this specification. For a better understanding of the invention, its operating advantages and specific objects attained by its uses, reference should be had to the accompanying drawings and descriptive matter in which there are illustrated preferred embodiments of the invention.

BRIEF DESCRIPTION OF THE DRAWINGS

In the drawings:

FIG. 2 is a hydraulic diagram of a control system embodying one form of the invention;

DETAILED DESCRIPTION OF THE INVENTION

Figure 1:
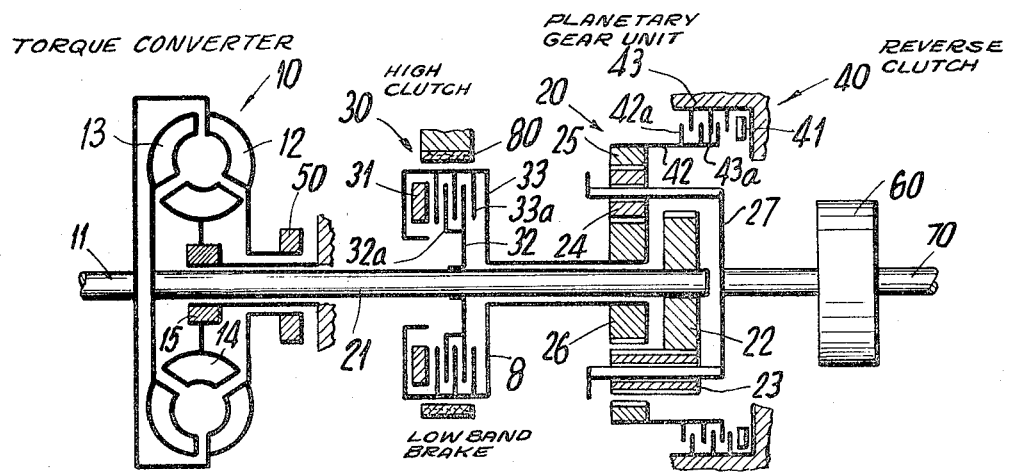
FIG. 1 shows, in schematic form, an example of an automatic transmission.

Referring now to FIG. 1, an automatic transmission comprises a torque converter 10, a planetary gear unit 20, a brake 40 for reverse, and a band brake 80 for low speed. The torque converter 10 comprises an input shaft 11 directly coupled to an engine crank shaft, a pump impeller 12 driven by the input shaft 11, a turbine runner 13, a stator 14, and a one-way clutch, so that the input shaft rotates in only one direction. The torque converter, as is known, transmits the rotating power increasing the torque by the action of the stator 14 when a difference in the rotating speed between the pump impeller 12 and the turbine runner 13 is large, and functions as a so-called fluid coupler permitting the stator to run at no load in the same direction as each runner when the difference in the speed approaches approximately 10 percent of the normal speed.

The planetary gear unit 20 consists of an input shaft 21, an input sun gear 22, pinions 23 meshed with sun gear 22, pinions 24, a ring gear 25 meshing with pinions 24, a low sun gear 26, and a planetary carrier 27 rotatably mounting pinions 23 and 24. The low sun gear 26 can be connected to input shaft 21 by means of the clutch 30 for high speed. This clutch 30 is composed of a clutch piston 31, a clutch hub 32, clutch plates 32a, 33a, and a clutch drum 33. The clutch plates 32a and 33a are splined alternately to clutch hub 32 and clutch drum 33, and coupled by frictional contact or released from each other according to movement of the clutch piston 31. The brake band 80 for low speed holds the clutch drum 33 stationary by operation of the piston. The brake 40 for reverse rotation comprises a brake piston 41, a reverse drum 42, plates 42a splined to drum 42, a stationary frame 43, and plates 43a splined to frame 43, and holds the reverse drum 42 fixed by movement of the clutch piston 41. On the inner circumference of the reverse drum 42 there is provided the ring gear 25 of the planetary gear unit.

The first speed or the low speed is established when high-speed clutch 30 and reverse brake 40 are released and clutch drum 33 is held stationary by the action of low-speed brake band 80 and, for example, a reduction gear ratio 1.82 is established. The second speed or the high speed is established when high-speed clutch 30 is applied and low-speed brake band 80 and reverse brake 40 are released, in which case the rotation of the input shaft 21 is delivered to the planetary gear 20 with a gear ratio 1:1.

The reverse speed is established when reverse brake 40 is applied and low-speed brake band 80 and high-speed clutch 30 are released, in which case the reverse rotation will be carried out with a gear ratio of 1.82.

An oil pump 50 is driven by the engine crank shaft together with the pump impeller 12. The output shaft 70 is coupled with the planetary carrier 27 and drives the wheels through a differential gear unit.

The control system according to the invention, as shown in FIG. 2, includes a pressure regulator valve 100, a manual valve 120, a shift valve 140, and a throttle valve 160, and a predetermined line pressure is applied to any one of the high-speed clutch 30, reverse brake 40, or low-speed brake band 80 depending upon the selected position of the manual valve 120 and the operating position of the shift valve 140. The oil pump 50 pumps oil from an oil sump 51 to force it into the pressure regulator valve 100 through a discharge passage 50a. A part of the discharge oil in the pressure regulator valve 100 may flow from a port 109 into the torque converter 10 through a passage 109a containing a check valve 10b, and circulates to the oil sump 51 through a check valve 10a and an oil passage 109b. In FIG. 2, the pressure regulator valve is shown in an inoperative position and the port 109 is blocked off by a valve land 102. In addition to valve land 102, the pressure regulator valve 100 includes valve lands 101 and 103, a spring 104, and chambers 105, 106 and 107 within a housing provided with ports 108, 109, 110 and 111. The oil discharged from the pump is supplied through the discharge passage 50a to the chamber 105 and at the same time it passes to the port 108 through an orifice 112. The circuit resistance provided by the orifice produces a pressure drop in the pressure passage proportional to the quantity of oil flowing therethrough. The pressurized oil in the chamber 106 is supplied from the port 111 through a passage 111a to a port 129 of the manual valve 120.

The manual valve 120 includes valve lands 121, 122 and 123, chambers 125 and 126, and ports 127, 128, 129, 130 and 131. On the right end of the manual valve 120, as viewed in FIG. 2, there is provided an interlock portion, which is engaged with a driving lever (not shown) through a shift lever which is operated by the driver. FIG. 2 shows the manual valve 120 in the drive position D OR in the automatic gear change range, where the port 129 is in communication with the ports 130 and 131 through the chamber 126.

The pressurized oil passes from the port 130 to the servo of the low-speed brake band 80 through the passage 130a to urge the piston 81 to the right against a spring 82 to fasten the brake band 80 to the clutch drum 33 shown in FIG. 1 and thus the planetary gear unit in FIG. 1 is placed in low gear. The pressurized oil exiting from the manual valve 120 through the port 131 is conducted simultaneously through a branched passageway 131a to the throttle valve 160, to a port 147 of the shift valve 140, and to a governor valve 170.

The throttle valve 160 produces a pressure proportional to a depressed amount by the accelerator or to an engine throttle opening in a passage 160a. The governor valve 170 similarly produces a pressure proportional to the vehicle speed in a passage 170a. The throttle valve 160 and governor valve 170 are of a well known construction, for example, and throttle valve 160 functions to convert the depressed amount of the accelerator into a corresponding spring compression, whereby a hydraulic pressure corresponding to this spring force will be supplied to the passage 160a. Also, the governor valve 170 provides a pressure corresponding to governor 60 located on the output shaft of the transmission and, by utilizing a centrifugal force proportional to the rotating speed of output shaft 70, a compression spring force is made to correspond with the centrifugal force, whereby a hydraulic pressure proportional to the spring force is established in the passage 170a.

The shift valve 140, as is known, is a valve which selects the gear shift point, responsive to the pressure proportional to the throttle opening and the pressure proportional to the vehicle speed, described above, in the chambers. This valve includes valve lands 143 and 142, a valve plug 141, a blocking plug 144, a pressure adjusting spring 146, and ports 147, 148, 149, 150, 151 and 152. Moreover, chambers 153, 154 and 155 are formed between the valve lands and the plugs. The governor pressure proportional to the vehicle speed is conducted to the chamber 154 through the port 148 and the throttle pressure proportional to the throttle valve opening is conducted to the chamber 155 through the port 149. As long as the throttle pressure is kept higher by a certain value than the governor pressure, the port 147 is blocked off by the valve land 143, as shown in FIG. 2, and the pressure from the passage 131a is not admitted into the chamber 153, which communicates with the exhaust port 151. Accordingly, under such condition the pressure will be applied to neither the high-speed clutch 30 nor the cylinder at the release side of the low-speed brake band. However, when the pressure from the governor valve 170 increases by a certain value higher than the throttle pressure, the governor pressure acting on the plug 141 urges the throttle valve to the left so that the port 147 communicates with the chamber 153. Thus, the high-speed clutch 30 and the release side of the servo piston actuating the low-speed brake band 80 receive the line pressure through the port 150 and branched passage 150a. The line pressure releases the low-speed brake band 80 thereby shifting the planetary gear unit to the high speed.

When the manual valve 120 is set in the position R (reverse range), the lands on the valve are displaced to the right, as viewed in FIG. 2, with land 121 blocking the exhaust port 127. The pressurized oil supplied to port 129 through the passage 111a enters into chamber 125 and with exhaust port 127 blocked off by land 121 the pressure from chamber 125 is applied through passage 128a to the cylinder of reverse brake 40, thus stopping the rotation of the reverse drum 42 shown in FIG. 1 and releasing, at the same time, both the high-speed clutch 30 and low-speed brake band 80 to shift the planetary gear unit 20 to the reverse speed. The clutch 30 and the brake bands 40 and 80 are all to be supplied with pressurized oil from the port 111 of the pressure regulator valve 100.

The hydraulic passages, such as the passage 111a, connected to the port 111 form a capacitive hydraulic load and do not require oil flow other than a small amount of leaked oil under the steady state. Accordingly, when the valve element of the pressure regulator valve 100 is located in the position as shown in FIG. 2, there exists no hydraulic load which requires flow for the oil pump 50, so that the discharge hydraulic pressure of the pump 50 will rise nearly in proportion to the increase of pump speed.

The discharge pressure of the pump 50 acts in the chambers 105 and 106 of the pressure regulator valve 100. The pressure in the chamber 105 urges the valve element to the right in FIG. 2, and is proportional to a pressure area at the left side of the land 101. The pressure in the chamber 106 will act as a force proportional to a difference in pressure area between the lands 102 and 101 facing each other, resulting in a rightward acting force as the land 102 has a larger diameter A than the diameter B of the land 101.

To cope with these two hydraulic pressures, pressure adjusting spring 104 is located on the right hand end of the valve and it provides a compression force and the valve element is moved to the right in proportion to the pressure increase. When the left end surface of the land 102 reaches the port 109, the pressurized oil in the chamber 106 is conducted to the torque converter 10 through the port 109. As a result, the pressurized oil begins to flow through orifice 112, with a resultant hydraulic pressure drop. With further increases in the speed of pump 50, the land 102 is displaced further in the rightward direction and completely opens port 109 to supply a sufficient flow of oil to torque converter 10 and, at the same time, the left pressure surface of the land 102 reaches the chamber 107. The chamber 107, in communication with the suction pipe 50b of the pump 50 through the passage 110a, forms a negative pressure chamber. If the chamber 106 is in communication with the chamber 107 even slightly, a comparatively large quantity of oil flows into the chamber 107, and a shunt passage is formed.

Any increase of oil flow into this shunt passage increases flow through orifice 112, resulting in a considerable reduction in the hydraulic pressure in chamber 106.

Figure 3:
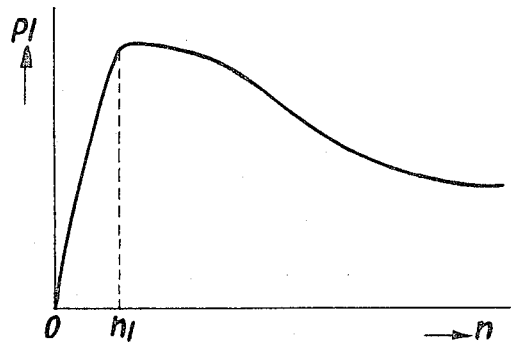
FIG. 3 is a characteristic curve showing the relation between the line pressure and the speed in the control system shown in FIG. 2.

Such a condition is illustrated in FIG. 3. Namely, oil flow which causes a pressure drop in the orifice 112 is not found up to the pump speed $n_1$, so that both pressures, in the chamber 105 and in the chamber 106, are equal, and the pressure P1 in the chamber 106, as shown in FIG. 3, will increase corresponding to increase of the speed. Further, when the rightward acting force on the valve element increases with increase of the speed, the valve land 102 is moved to the right against the spring 104 to open the port 109. Thus, the pressure P1 in the chamber 106 gradually decreases as shown in the curve and when, with a further increase of the speed, the force acting on the valve element increases to communicate the chamber 106 with the chamber 107, an oil flow is produced in the shunt passage, which gradually increases, so that the pressure P1 tends to drop suddenly due to the increase in the speed.

The pressure in the Chamber 106 is supplied to the above-described pressure passages from the port 111 as the line pressure or the control pressure.

In the hydraulic control system according to the invention, the line pressure is powered, as shown in the characteristic curve of FIG. 3, after the pump speed exceeds an appropriate value, so that automatic gear change in the ordinary drive range will be performed smoothly and, moreover, as a sufficiently high line pressure is applied to the clutches and brakes at the time of starting, the vehicle may be started with sureness. Since the shunt passage used for lowering the line pressure forms a circulation circuit to the suction side of the oil pump 50, the oil flow in the shunt passage when the pump is running at a high speed will be neither a burden on the pump 50 nor an output loss for the engine. Accordingly, during high speed running of the pump, cavitation does not occur and noise of the pump will be reduced as well.

Figure 5:
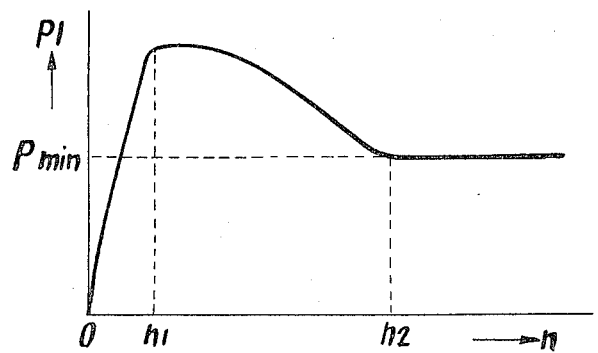
FIG. 5 is a characteristic curve showing the relation between the line pressure and the speed in the control system of FIG. 4.
Figure 4:
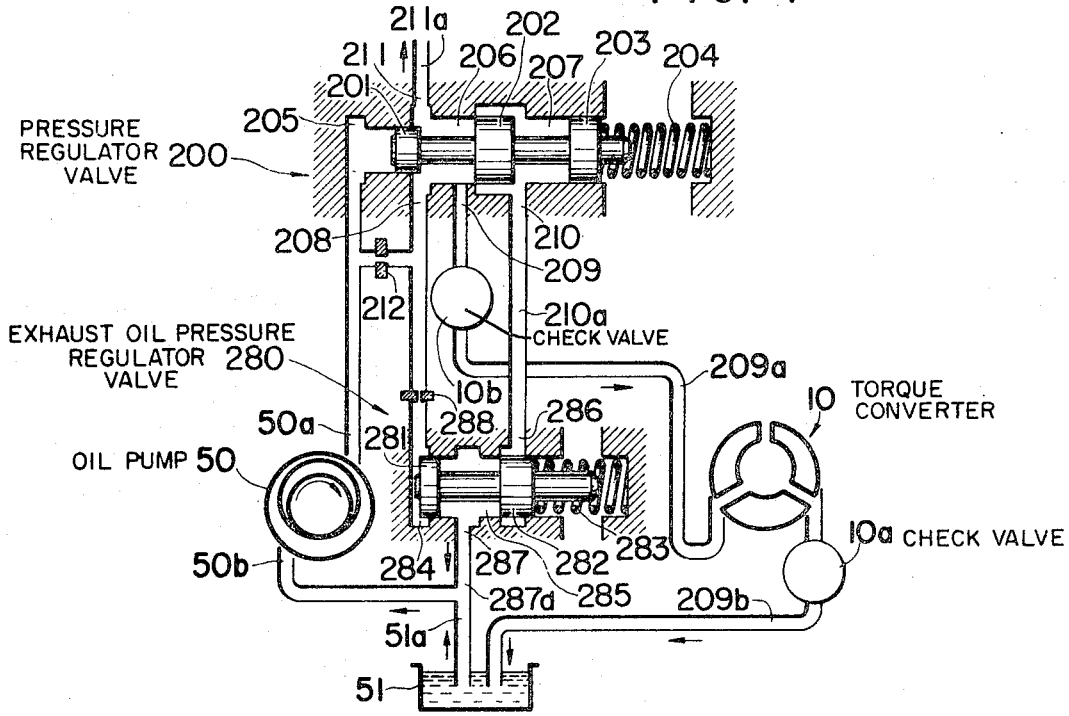
FIG. 4 is a hydraulic diagram of a control system which includes an exhaust oil pressure regulator valve in addition to the control system of FIG. 2.

FIG. 4 shows a modified hydraulic control circuit for the control system of FIG. 2. A pressure regulator valve 200 has the same construction as the pressure regulator valve 100 in FIG. 2 and, in addition, an exhaust oil pressure regulator valve 280 is provided in the shunt passage. The pressure regulator valve 200 includes lands 201, 202 and 203 and is urged to the left by a pressure adjusting spring 204. The valve is divided into three chambers 205, 206 and 207 by the respective lands. The chamber 206 contains ports 208, 209 and 211 and chamber 207 provides a port 210. A discharge pipe 50a of a pump 50 communicates with the chamber 205 and also communicates with the port 208 and the chamber 206 through an orifice 212. The hydraulic pressure in the chamber 206 is supplied as a line pressure to the clutches and brakes through the port 211, a passage 211a, a manual valve (not shown), and a shift valve (not shown). The passage 211a corresponds to the passage 111a in FIG. 2. The exhaust oil pressure regulator valve 280 installed in the shunt passage includes valve lands 281 and 282, a pressure adjusting spring 283, chambers 284 and 285, and ports 286 and 287. The chamber 284 communicates with the chamber 206 of the pressure regulator 200 through an orifice 288, and the port 286 communicates through a passage 210a with the port 210. Additionally, the port 287 is connected to a suction pipe 50b of pump 50 through a passage 287a. Thus, by a combination of pressure regulator valve 200 and exhaust oil pressure regulator valve 280, the line pressure P1 is endowed with the characteristic as shown in FIG. 5.

Namely, exhaust oil pressure regulator valve 280 has no effect on the line pressure P1 until the pressure in chamber 206 is introduced into chamber 207 by a sufficient rise in speed of pump 50. Therefore, the characteristic of the line pressure P1 remains the same as FIG. 3 until the pump speed reaches $n_2$ in FIG. 5. When the pump speed exceeds $n_2$, the line pressure P1 or the pressure in the chamber 206 tends to lower further. The pressure in the chamber 206 simultaneously acts on the chamber 284 of the exhaust oil pressure regulator valve 280 and, when it has dropped to a pressure value of Pmin., the port 286, which was opened, is closed by the valve land 282, thus blocking off the shunt passage. Therefore, the pressure in chamber 206 of pressure regulator valve 200 tends to rise. However, such an increase in pressure acts on chamber 284 of exhaust oil pressure regulator valve 280, so that port 286 is opened again to form the shunt passage. In other words, when the pump speed exceeds $n_2$, the line pressure P1 is always maintained at a minimum pressure Pmin. as shown by the characteristic curve of FIG. 5. Therefore, the line pressure is prevented from dropping suddenly.

Figure 6:
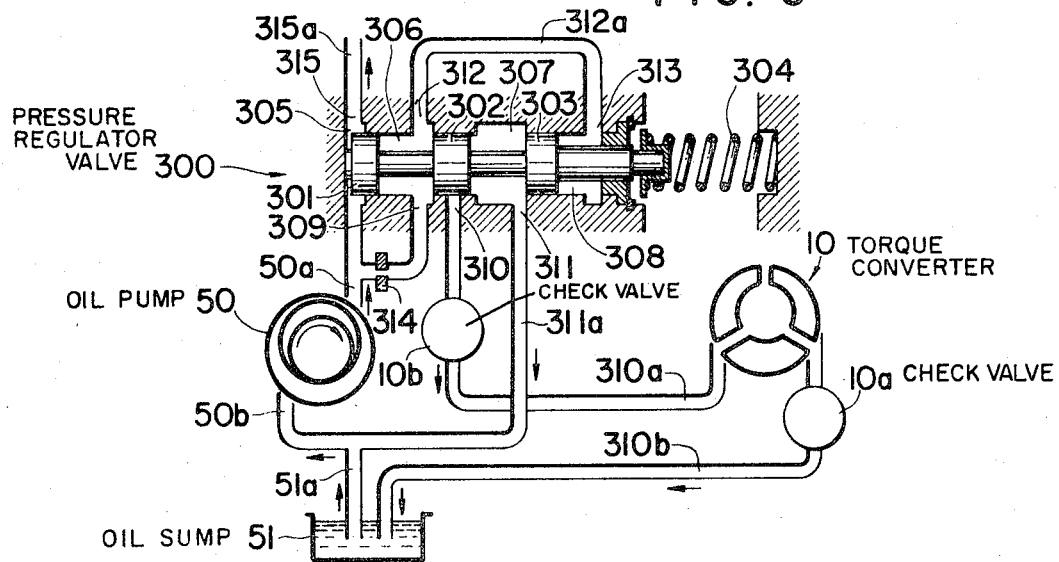
FIG. 6 is a hydraulic diagram of a control system of another embodiment of the invention.

FIG. 6 shows another embodiment of a hydraulic control circuit containing a pressure regulator valve 300. This valve 300 includes valve lands 301, 302 and 303, a pressure adjusting spring 304, chambers 305, 306, 307 and 308, and ports 309, 310, 311, 312 and 313. A discharge pipe 50a of pump 50 is connected directly to the chamber 305 and, through an orifice 314, it is connected to the chamber 306. The chambers 306 and 308 are in communication through a passage 312a. The chamber 307 is connected by a passageway 311a to a suction pipe 50b of the pump 50 to form a shunt passage.

The characteristic of pressure versus speed obtained by such a pressure regulator valve is shown in FIG. 3. In this case, the line pressure P1 is obtained from the chamber 305 through the port 315, and the passage 315a corresponds with the passage 111a in FIG. 2. Namely, when the pump speed rises, the line pressure P1 increases proportionally to the pump speed, and such condition exists as long as the passage 310 is not opened by the land 302. The pressure P1 acts on a differential area between the left pressure area of the land 301 and the right pressure area of the land 303. When the valve element is moved to the right against the spring 304 with an increase in the pressure P1, the port 310 is opened and simultaneously a predetermined quantity of oil flows into the torque converter 10. As a result, a pressure drop takes place in the orifice 314, thereby reducing the pressure in the chamber 306. That is, the pressure acting on the right pressure area of the land 301 tends to decrease, which corresponds with an increase in the rightwards acting force on the valve element and thereby the valve element is further moved to the right. When the chamber 306 communicates with the chamber 307 by the rightward movement of the valve element, the oil begins to flow into the shunt passage, thus causing a further increase in the pressure drop through the orifice 314.

On the other hand, the oil pump 50 is provided with a so-called drooping characteristic in that the discharge pressure is lowered with an increase in the normal discharge quantity, so that the increase in the quantity of oil flowing into the shunt passage results in a reduction in the discharge pressure of the pump 50.

Since the balanced condition of the pressure regulator valve 300 is established when a difference between a rightwards acting force on the valve element by the pressure P1 in the chamber 305 and a leftwards acting force on the valve element by the pressure in the chamber 308 becomes constant, the increase of shunt oil flow due to an increase of the pump speed permits the latter pressure to drop. On the other hand, under such balanced condition the valve element comes to a standstill at a position where the above difference becomes constant by lowering of the pressure P1. In other words, as soon as the shunt passage is opened, the line pressure tends to drop with an increase in the pump speed and displays the same characteristic as shown in FIG. 3.

While specific embodiments of the invention have been shown and described in detail to illustrate the application of the principles of the invention, it will be understood that the invention may be embodied otherwise without departing from such principles

What is claimed is:

1. In a hydraulic control system for an automatic transmission including hydraulic servo units controlling operation of the transmission, hydraulic passageways communicating with said servo units, an engine-driven pump supplying hydraulic fluid under pressure to the hydraulic passageways, and a pressure regulator valve interposed between the pump and the hydraulic passageways to regulate the pressure of the working fluid supplied to the servo units, the improvement comprising, in combination, said pressure regulator valve including a housing; a valve element movable axially of said housing and having land means dividing said housing into chambers; spring means biasing said valve element in one direction; first passage means connected to the pump outlet and subjecting said valve element to the pump outlet pressure in opposition to the spring bias; second passage means, including flow restriction means, connecting the pump outlet to one of said chambers; a land on said valve element separating said first and second passage means, whereby said valve element is subjected to the resultant of the pressure in said first passage means and said one chamber; a port in one of said chambers communicating with said hydraulic passageways to supply working fluid under pressure thereto; and a shunt passage connecting a chamber adjacent said one chamber connected to said second passage means to the pump inlet; a land on said valve element controlling communication between said adjacent chambers; said valve element, when the pump speed exceeds a predetermined value, moving, against the spring bias, to a position establishing communication between said first and second chambers for return of working fluid to the pump through said shunt passage to reduce the pressure of the working fluid supplied to said hydraulic passageways.

2. A hydraulic control system, as set forth in claim 1, in which said valve element has at least three axially spaced lands forming at least three chambers within said housing spaced apart by said lands; said first passage means comprising a first conduit communicating between said pump and a first one of said chambers for receiving working fluid directly from said pump; said second passage means comprising a second conduit communicating between said pump and a second one of said chambers spaced from the first one of said chambers, and means located within said second conduit for effecting a pressure reduction in the working fluid when the working fluid flows through said second conduit into the second one of said chambers; said shunt passage being connected at one end to a third one of said chambers and at its other end to the inlet of said pump; whereby, when the pump speed exceeds a predetermined value, the pressure within the second one of said chambers is reduced by said means located in said second conduit and thereby effects a displacement of said valve element so that the working fluid passes into said shunt passage and the pressure applied to said hydraulic passages from the second one of said chambers is lowered.

3. A hydraulic control system, as set forth in claim 2, including means located within said shunt passage and in communication with said second conduit for shutting off flow through said shunt passage when the pressure of the oil flowing therethrough drops below a predetermined level.

4. A hydraulic control system, as set forth in claim 3, wherein said means located within said shunt passage comprises an exhaust pressure regulator valve, said exhaust pressure regulator valve comprising a second housing, a second valve element located within said second housing and having axially spaced lands thereon which, in combination with said second housing, form at least two chambers spaced apart by the lands on said second valve element, said second valve element being axially displaceable within said exhaust pressure regulator valve in response to pressure differences acting on its lands.

5. A hydraulic control system, as set forth in claim 4, wherein said second housing has a port therein communicating with a third one of said chambers in said pressure regulator valve, one of the lands on said second valve element being arranged to block said last-mentioned port when the pressure in the second one of said chambers of said pressure regulator valve is reduced, whereby the pressure in the second one of said chambers of said pressure regulator valve increases and, in turn, increases the working fluid pressure so that the land blocking said last-mentioned port is displaced axially from the blocking position.

6. A hydraulic control system, as set forth in claim 2, wherein a first one of said lands is positioned between and separates the first and the second ones of said chambers, a second one of said lands is positioned between the second one and the third one of said chambers and, as the second one of said lands is displaced axially toward the third one of said chambers, flow passes from the second one to the third one of said chambers for passage into said shunt passage.

7. A hydraulic control system, as set forth in claim 2, wherein the spring means biases said valve element so that the passage between the second and the third ones of said chambers is closed.

8. A hydraulic control system, as set forth in claim 2, wherein said means located in said second conduit for effecting a pressure reduction comprises an orifice positioned within said second conduit.

9. A hydraulic control system, as set forth in claim 1, wherein a fourth one of said chambers is spaced from the third one of said chambers by the third one of said lands, and a by-pass conduit interconnects the second one of said chambers and the fourth one of said chambers.

10. A hydraulic control system, as set forth in claim 2, including a second port formed in said housing communicating with one of said chambers and blocked by the second one of said lands when said valve element is displaced toward the first one of said chambers and the second one of said lands blocks flow from the second to the third one of said chambers, a passage connecting said second port to a torque converter, and a check valve positioned within said last-mentioned passage so that, as the second one of said lands is displaced toward the third one of said chambers, said second port is uncovered and fluid flows from the second one of said chambers to the torque converter.

* * * * *